(12) United States Patent
Pieter et al.

(10) Patent No.: US 7,790,906 B2
(45) Date of Patent: Sep. 7, 2010

(54) METHOD FOR THE PURIFICATION OF BETAINES

(75) Inventors: Ina Pieter, Bensheim (DE); Bernhard Hanke, Bensheim (DE)

(73) Assignee: PULSION Medical Systems AG, Munich (DE)

( * ) Notice: Subject to any disclaimer, the term of this patent is extended or adjusted under 35 U.S.C. 154(b) by 195 days.

(21) Appl. No.: 11/920,190

(22) PCT Filed: Jun. 1, 2006

(86) PCT No.: PCT/DE2006/000959

§ 371 (c)(1),
(2), (4) Date: Nov. 9, 2007

(87) PCT Pub. No.: WO2006/128451

PCT Pub. Date: Dec. 7, 2006

(65) Prior Publication Data

US 2009/0069573 A1    Mar. 12, 2009

(30) Foreign Application Priority Data

Jun. 1, 2005    (DE) .................. 10 2005 025 560

(51) Int. Cl.
*C07D 209/56* (2006.01)
(52) U.S. Cl. .................................... 548/427
(58) Field of Classification Search ........... 548/427
See application file for complete search history.

(56) References Cited

U.S. PATENT DOCUMENTS

| 2,245,249 | A | | 6/1941 | Brooker |
| 2,895,955 | A | | 7/1959 | Heseltine et al. |
| 4,576,905 | A | | 3/1986 | Gunther et al. |
| 4,831,136 | A | | 5/1989 | Gunther et al. |
| 4,874,866 | A | | 10/1989 | Gunther et al. |
| 5,576,074 | A | * | 11/1996 | Weigel et al. ............... 427/559 |
| 2004/0192917 | A1 | * | 9/2004 | Srivastava et al. ............ 546/51 |

FOREIGN PATENT DOCUMENTS

| AT | E 49 597 B | 4/1985 |
| CH | 387 007 | 1/1965 |
| CN | 1 196 351 A | 10/1998 |
| DE | 20 46 141 A1 | 3/1972 |
| EP | 0 366 440 B1 | 5/1990 |
| EP | 1 211 294 A1 | 6/2002 |
| GB | 890622 | 3/1962 |
| WO | WO 95/07888 A | 3/1995 |
| WO | WO 2004/078109 A2 | 9/2004 |

OTHER PUBLICATIONS

International Search Report, 2008.
International Search Report, 2008.

* cited by examiner

*Primary Examiner*—Rei-tsang Shiao
(74) *Attorney, Agent, or Firm*—Collard & Roe, P.C.

(57) ABSTRACT

The invention relates to a method for purification of synthetically-produced compounds, comprising a betaine structure in the molecule, for example, indocyan green, characterized in that reaction by-products, starting materials and/or other impurities such as NaI used during production are separated by extraction.

4 Claims, No Drawings

METHOD FOR THE PURIFICATION OF BETAINES

CROSS REFERENCE TO RELATED APPLICATIONS

Applicants claim priority under 35 U.S.C. §119 of German Application No. 10 2005 025 560.4 filed Jun. 1, 2005. Applicants also claim priority under 35 U.S.C. §365 of PCT/DE2006/000959 filed Jun. 1, 2006. The international application under PCT article 21 (2) was not published in English.

The present invention relates to a method for the purification of synthetically produced chemical substances that contain a betaine structure in the molecule.

In particular, this method is suitable for the purification of indocyanine green (Indocyanine Green), a dye described in the American pharmacopoeia. Indocyanine green is 2-(7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolinium hydroxide, betaine sodium salt, and is characterized by the following chemical structure:

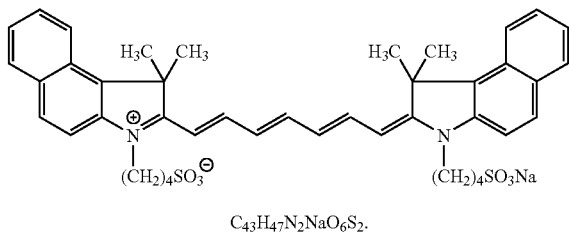

$C_{43}H_{47}N_2NaO_6S_2$.

Indocyanine green is a green dye that is used in medicine, for the diagnosis of cardiac, cardiovascular, microcirculation, and liver function.

The production of indocyanine green takes place, for example, by means of condensation of two indolinium molecules, using sodium iodide. The sodium iodide is added to the synthesis salt in order to bring about precipitation of the dye. Conventional measures for reducing the sodium iodide content are complicated and cost-intensive, and this leads to clearly increased production costs of the dye. Discontinuous treatment of indocyanine green (ICG) by means of crystallization and precipitation, respectively, is only possible with restrictions; purification of the substance on a large technical scale is almost impossible. While chromatographic methods for the purification of ICG are possible on a laboratory scale, larger amounts cannot be purified in a single work process.

The present invention was based on the task of making available a method for the purification of betaines, particularly of indocyanine green, in which the synthesis path usual in the state of the art and also introduced in plants on a large technical scale can remain unchanged, so that only the purification step undergoes a change.

Accordingly, the object of the present invention is a method for the purification of chemical substances and chemical compounds that contain a betaine structure in the molecule, which method is characterized in that reaction by-products, starting compounds and/or other contaminants that are insoluble in the selected organic solvent are removed by extraction.

The method according to the invention takes advantage of the solubility differences between the contaminants and betaines. The method is particularly well suited for the purification of indocyanine green, if sodium iodide (NaI) is used as the precipitation agent during its production, for conversion of the acid to the corresponding Na salt.

The use of NaI, which can still be contained in several % in commercially available products, could be the cause for the fact that the types and scope of the diagnostic use of ICG are restricted.

In addition to indocyanine green, natural substances that can be purified of inorganic contaminants in this manner, particularly alkaloids of the indol and isoquinoline type, are possible subjects for the method according to the invention.

The extraction is performed in an organic solvent, preferably a non-aqueous solvent, particularly in aprotic solvents (e.g. $CH_2Cl_2$ or acetic ester). The possibility of removing NaI from indocyanine green or separating it from the latter by means of extraction, is surprising in that the indocyanine green is only moderately soluble in the non-aqueous solvent $CH_2Cl_2$ that is preferably used, while NaI is insoluble in it.

Since some of the contaminants to be removed, such as inorganic salts, for example, including NaI, are soluble in water, a non-aqueous solvent is preferably used as the solvent. Drying of the non-aqueous solvent can take place in known manner, by way of molecular sieves, $P_2O_6$, etc.

The extraction according to the invention can be carried out by means of shaking out (sequential extraction) or continuously. Sequential extraction usually takes place in a shaker funnel. However, shaking the substances out is relatively complicated, time-consuming, and therefore less preferred. Preferably, extraction is therefore carried out continuously. The so-called Soxhlet extraction is particularly suitable for this.

For continuous extraction, the substance to be purified is preferably put into a sleeve or similar accommodation device that is permeable for the solvent, and continuously flushed with the solvent, slightly below its boiling point. When this is done, the soluble components are dissolved, while insoluble components remain in the accommodation device; in other words, in the purification of indocyanine green, this compound is dissolved by the extraction solvent and removed from the device, while substances that are insoluble in the solvent, e.g. NaI, remain behind.

EXAMPLE

To carry out the method according to the invention, an indocyanine green available from usual industrial production, which contained 4.6% NaI, was subjected to continuous extraction in a Soxhlet apparatus.

For the production of non-aqueous methylene chloride, 500 ml methylene chloride were dried over a molecular sieve (4 Å from the Roth company, 0.4 nm, bead form) and subsequently distilled. 100 ml of the first run were discarded, so that approximately 400 ml purified and dried methylene chloride were available for the subsequent continuous extraction.

266 mg indocyanine green were weighed into a paper sleeve suitable for the Soxhlet apparatus. 250 ml of the purified and dried methylene chloride were placed into a 500 ml flask as the substance presented. The apparatus furthermore contained a reflux cooler and a drying tube set onto the latter, filled with $CaCl_2$. The extraction was carried out over a time period of 30 hours, at a water bath temperature of 48° C. Subsequently, the deep-green solution obtained was concentrated in a rotation evaporator and lyophilized.

The indocyanine green obtained contained <0.4% NaI. This amount is more than 10 times below the tolerance range established by the USP for parenteral use of indocyanine green (Indocyanine Green for Injection).

Extractions with solvents such as acetone resulted in NaI, which is soluble in this solvent to a certain extent, also being extracted.

Extraction with solutions smaller than, for example extraction with acetone, chloroform, cyclohexane, and heptane, resulted in no separation of the substances indocyanine green and NaI.

The invention claimed is:

1. Method for purification of a synthetically produced chemical substance indocyanine green that contains a betaine structure in the molecule comprising removing by extraction a reaction by-product sodium iodide using an organic solvent.

2. Method according to claim 1, wherein the extraction is carried out with methylene chloride as the organic solvent.

3. Method according to claim 1, wherein the extraction is carried out continuously.

4. Method according to claim 3, wherein the extraction is carried out by means of the Soxhlet method.

* * * * *